US012723939B2

(12) United States Patent
Donnelly et al.

(10) Patent No.: US 12,723,939 B2
(45) Date of Patent: Sep. 1, 2026

(54) MEASUREMENT DEVICE

(71) Applicant: Fire NDT Pty Ltd, Bradbury (AU)

(72) Inventors: Mark Donnelly, Bradbury (AU); Anthony Patrick Lima, Richlands (AU)

(73) Assignee: FIRE NDT TECHNOLOGIES PTY LTD, Forest Lake (AU)

(*) Notice: Subject to any disclaimer, the term of this patent is extended or adjusted under 35 U.S.C. 154(b) by 226 days.

(21) Appl. No.: 18/288,023

(22) PCT Filed: Mar. 21, 2022

(86) PCT No.: PCT/AU2022/050253
§ 371 (c)(1),
(2) Date: Oct. 23, 2023

(87) PCT Pub. No.: WO2022/232865
PCT Pub. Date: Nov. 10, 2022

(65) Prior Publication Data

US 2024/0219251 A1 Jul. 4, 2024

(30) Foreign Application Priority Data

May 5, 2021 (AU) ................................ 2021901337

(51) Int. Cl.
*G01L 11/06* (2006.01)
*G01B 17/02* (2006.01)

(52) U.S. Cl.
CPC ............. *G01L 11/06* (2013.01); *G01B 17/02* (2013.01)

(58) Field of Classification Search
CPC ................................ G01F 1/668; G01L 11/06
See application file for complete search history.

(56) References Cited

U.S. PATENT DOCUMENTS 3,977,252 A 8/1976 Krylova et al.
4,286,470 A * 9/1981 Lynnworth ............. G01F 1/662 73/637

(Continued)

FOREIGN PATENT DOCUMENTS

CN 201094102 Y 7/2008
CN 105043647 A 11/2015

(Continued)

OTHER PUBLICATIONS

International Search Report and Written Opinion issued in International Patent Application No. PCT/AU2022/050253 on Jun. 1, 2022.

*Primary Examiner* — Herbert K Roberts
(74) *Attorney, Agent, or Firm* — FisherBroyles, LLP; Cara L. Crowley-Weber; Gregory T. Fettig

(57) ABSTRACT

An aspect of the disclosure relates to a non-destructive device and method of determining the pressure of liquid within a pipe. The method comprises the steps of transmitting, by a first probe, ultrasound, wherein the first probe is disposed on a surface of the pipe. The method then receives, by a second probe, the transmitted ultrasound, the second probe being disposed on a surface of the pipe opposite to the first probe. The celerity of the transmitted ultrasound through the liquid within the pipe can then be determined. The pressure of the liquid can then be determined based on the determined celerity of the transmitted ultrasound.

9 Claims, 5 Drawing Sheets

(56) References Cited

U.S. PATENT DOCUMENTS 4,373,401 A * 2/1983 Baumoel ................. G01F 1/662
73/644
6,883,386 B2 * 4/2005 Osone ..................... G01F 15/18
73/861.25
2006/0201254 A1 9/2006 Flik et al.
2010/0010750 A1 * 1/2010 Baron .................. G01N 29/032
702/30
2019/0011300 A1 * 1/2019 Gloss ...................... G01F 25/10

FOREIGN PATENT DOCUMENTS

DE 102012022376 A1 5/2014
JP 2006170870 A 6/2006

* cited by examiner

MEASUREMENT DEVICE

CROSS-REFERENCE TO RELATED APPLICATIONS

This application is a 35 U.S.C. § 371 National Phase Application of PCT Application No. PCT/AU2022/050253 filed Mar. 21, 2022, which claims priority to Australian Application No. 2021901337, filed May 5, 2021, the contents of which are hereby incorporated by reference herein in their entireties.

TECHNICAL FIELD

The present invention relates generally to a measurement device and, in particular, to measure liquid pressure inside a pipe.

BACKGROUND

A fire sprinkler system includes multiple networks of pipes, where each network services an area. When work is to be performed on one of the networks, the water going to this particular network must be turned off. Failure to turn off the water to this network will result in a large amount of water inundating the area, especially when the water has a pressure of between 1000 and 2000 kPa. Damage to objects within the inundated area is also likely. On the other hand, water going to the other networks must be maintained, to ensure that these areas are still protected by the fire sprinkler system.

In a conventional arrangement, a destructive testing (e.g., using a sure-off tester) is used to determine the water pressure within a pipe. If the water pressure is sufficiently low, then work can commence on the network. Once work is completed, the damaged pipe (at which the destructive test device is located) is replaced.

The process of using the destructive test device to measure water pressure and replacing the damaged pipe adds time and costs in completing the work.

SUMMARY

It is an object of the present invention to substantially overcome, or at least ameliorate, one or more disadvantages of existing arrangements.

Disclosed are arrangements which seek to address the above problems by providing a non-destructive testing device and method. The non-destructive testing device and method uses ultrasound to determine the liquid pressure within a pipe.

According to an aspect of the present disclosure, there is provided A method of determining a pressure of liquid within a pipe, the method comprising the steps of: transmitting, by a first probe, ultrasound, wherein the first probe is disposed on a surface of the pipe; receiving, by a second probe, the transmitted ultrasound, the second probe being disposed on a surface of the pipe opposite to the first probe; determining a celerity of the transmitted ultrasound through the liquid within the pipe; and determining the pressure of the liquid based on the determined celerity of the transmitted ultrasound.

According to another aspect of the present disclosure, there is provided a device configured for determining a pressure of liquid within a pipe, the device comprising: a first probe; a second probe; and a control unit, wherein the control unit executes an application program to perform a method of determining the pressure of liquid within the pipe, the method comprising the steps of: transmitting, by the first probe, ultrasound, wherein the first probe is disposed on a surface of the pipe; receiving, by the second probe, the transmitted ultrasound, the second probe being disposed on a surface of the pipe opposite to the first probe; determining a celerity of the transmitted ultrasound through the liquid within the pipe; and determining the pressure of the liquid based on the determined celerity of the transmitted ultrasound.

Other aspects are also disclosed.

BRIEF DESCRIPTION OF THE DRAWINGS

At least one embodiment of the present invention will now be described with reference to the drawings, in which.

DETAILED DESCRIPTION

Figure 1:
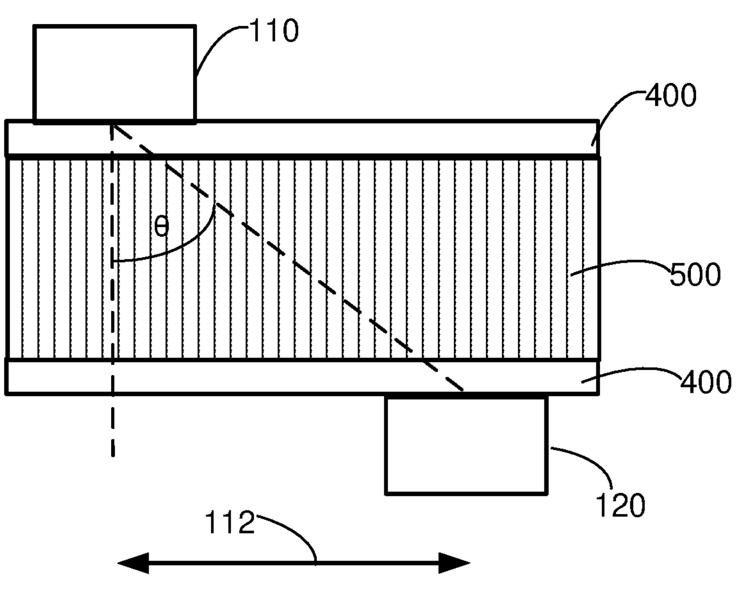
FIG. 1 shows an arrangement for using ultrasound to measure the liquid pressure within a pipe according to the present disclosure.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

FIG. 1 shows a longitudinal cross section of a pipe 400 through the centre of the pipe 400. FIG. 1 further illustrates an arrangement for measuring the pressure of liquid 500 within the pipe 400 in a non-destructive manner. The arrangement uses two probes 110 and 120, whereby one probe 110 transmits ultrasound and the other probe 120 receives the transmitted ultrasound. The speed of sound travelling through the liquid 500 changes depending on the pressure in which the liquid 500 is under. Therefore, the time difference between the transmitted ultrasound and the received ultrasound indicates the pressure in which the liquid 500 is under.

The probe 110 is disposed on the surface of the pipe 400 and the probe 120 is disposed on the opposite surface of the pipe 400. The probe 120 is longitudinally offset along the pipe 400 by a distance 112, such that the probe 120 is located an angle θ relative to the probe 110. The angle θ is in the range of 0° to 30°. The angle θ at the upper range creates a greater distance between the probes 110 and 120. The probes 110 and 120 are coupled to the surface of the pipe 400 using a couplant.

The pipe 400 can be made from metal, plastic, and the like. The liquid 500 can be water, oil, and the like.

Figure 2:
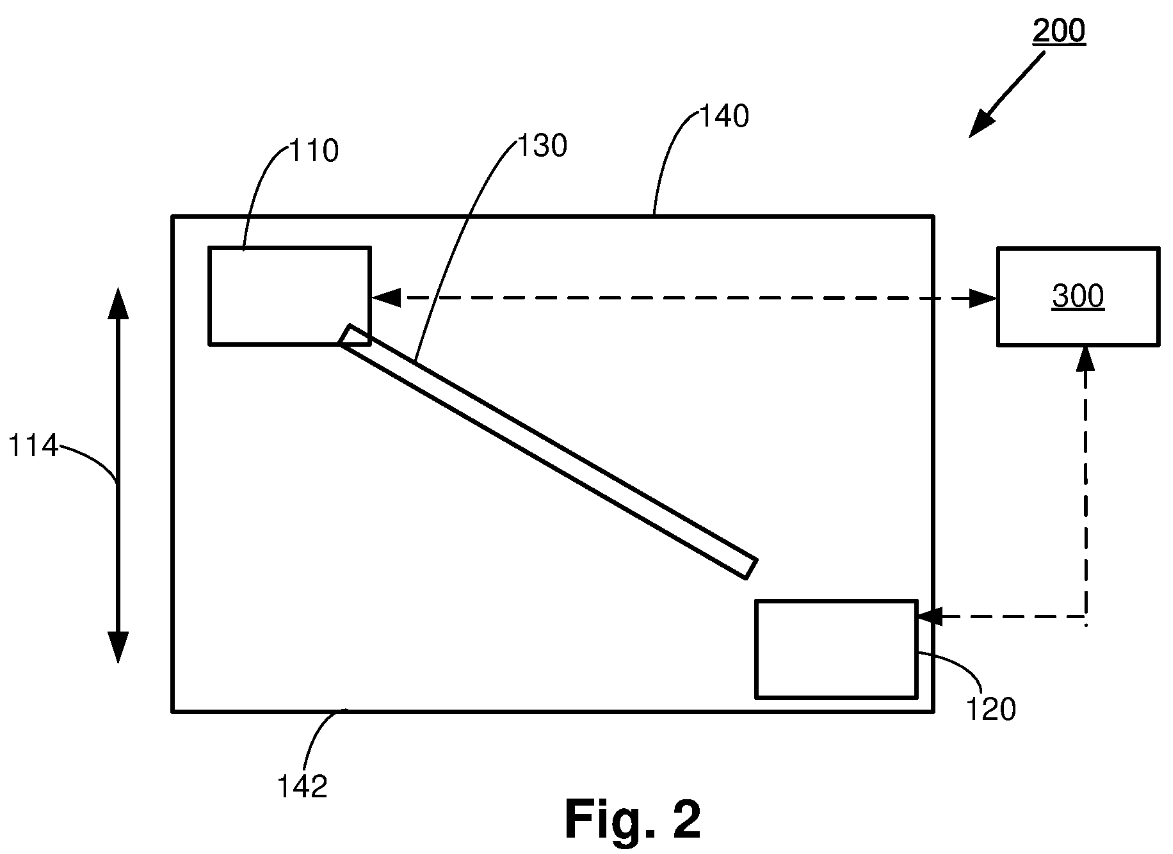
FIG. 2 is a device for measuring the liquid pressure according to the present disclosure.

FIG. 2 shows a non-destructive measurement device 200 having the probes 110, 120, a frame 140, and a control unit 300. The probes 110 and 120 are the probes shown in FIG. 1. The probes 110 and 120 are disposed on the frame 140.

The frame 140 is flexible and includes a track 130 on which the probe 110 is disposed. The probe 110 is movable along the track 130. The frame 140 is configured to be coupled to a pipe to be measured. When the frame 140 is placed on pipes with varying sizes, the probe 110 can be moved to maintain the required angle θ and to be placed opposite the probe 120 on the surface of the pipe 400. For example, the probe 120 is first coupled to the surface of the pipe 400 where one side 142 is disposed longitudinally along the pipe 400. The frame 140 is then wrapped around the pipe 400 and the probe 110 is coupled to the opposite surface of the pipe 400. Depending on the pipe size, the probe 110 is moved along the track 130 to enable the probe 110 to be coupled to the opposite surface of the pipe 400.

The track 130 also includes a sensor (not shown) to determine the position of the probe 110 along the track 130. Further, the device 200 also includes a temperature sensor (not shown) to determine the temperature of the pipe 400, on which the probes 110 and 120 are disposed. In one alternative arrangement, the temperature sensor measures the ambient temperature in which the device 200 is disposed.

In another arrangement, the probe 120 is disposed on the track 130.

Other arrangements for maintaining the required angle θ between the probes 110 and 120 for different pipe sizes can be employed. These other arrangements may use a rigid frame and further mechanisms to maintain the required angle θ.

Each of the probes 110 and 120 comprises a piezoelectric transducer for converting electrical energy into sound waves. The probes 110 and 120 are connected to the control unit 300. The control unit 300 is configured to provide control signals to the probes 110 and 120 to transmit ultrasound. The ultrasonic sound transmitted by each of the probes 110 and 120 is above the kHz range.

Each of the probes 110 and 120 also comprises a receiver for receiving ultrasound and converting the received ultrasound into electrical signals. The control unit 300 is also configured to receive signals from the probes 110 and 120 representing the ultrasound received by the respective probes 110 and 120.

Figure 3A:
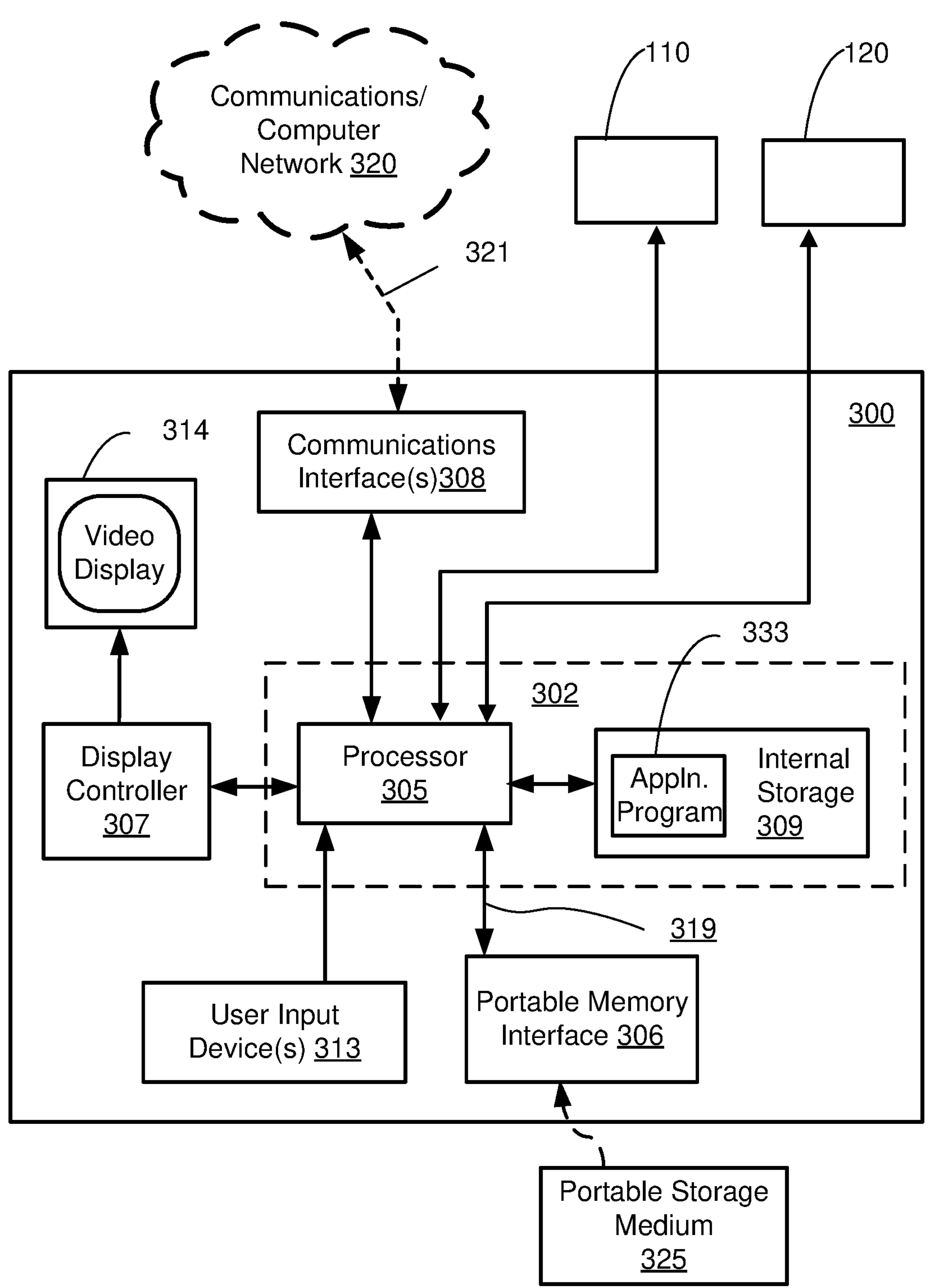
FIGS. 3A and 3B collectively form a schematic block diagram representation of a control unit of the device shown in FIG. 2.
Figure 3B:
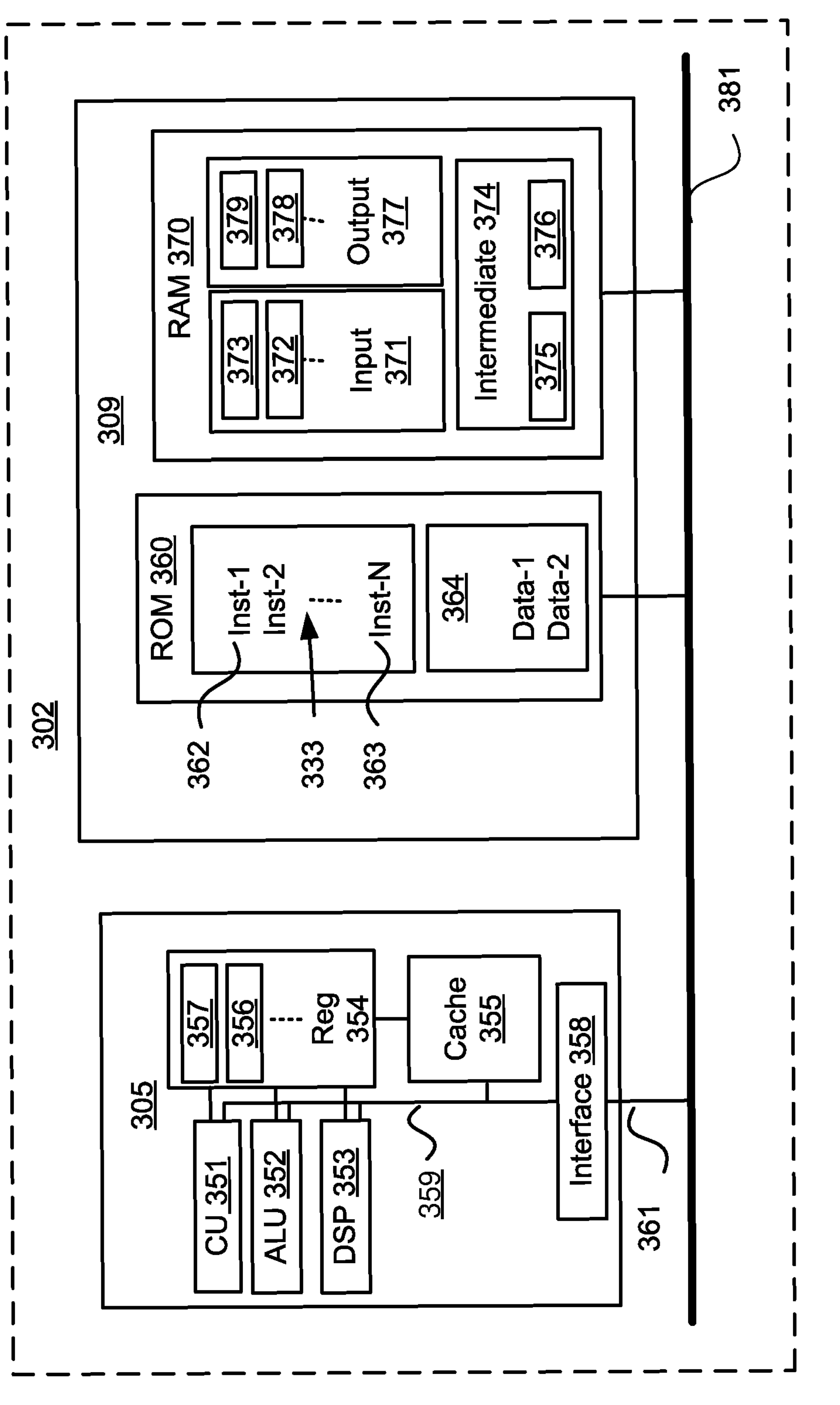

FIGS. 3A and 3B collectively form a schematic block diagram of the control unit 300 including embedded components, upon which the non-destructive measurement methods to be described are desirably practiced.

As seen in FIG. 3A, the device 300 comprises an embedded controller 302. Accordingly, the device 300 may be referred to as an "embedded device." In the present example, the controller 302 has a processing unit (or processor) 305 which is bi-directionally coupled to an internal storage module 309. The storage module 309 may be formed from non-volatile semiconductor read only memory (ROM) 360 and semiconductor random access memory (RAM) 370, as seen in FIG. 3B. The RAM 370 may be volatile, non-volatile or a combination of volatile and non-volatile memory.

The device 300 includes a display controller 307, which is connected to a video display 314, such as a liquid crystal display (LCD) panel or the like. The display controller 307 is configured for displaying graphical images on the video display 314 in accordance with instructions received from the embedded controller 302, to which the display controller 307 is connected.

The device 300 also includes user input devices 313 which are typically formed by keys, a keypad or like controls. In some implementations, the user input devices 313 may include a touch sensitive panel physically associated with the display 314 to collectively form a touch-screen. Such a touch-screen may thus operate as one form of graphical user interface (GUI) as opposed to a prompt or menu driven GUI typically used with keypad-display combinations. Other forms of user input devices may also be used, such as a keyboard (not illustrated), a microphone (not illustrated) for voice commands, or a joystick/thumb wheel (not illustrated) for ease of navigation about menus.

As seen in FIG. 3A, the device 300 also comprises a portable memory interface 306, which is coupled to the processor 305 via a connection 319. The portable memory interface 306 allows a complementary portable memory device 325 to be coupled to the device 300 to act as a source or destination of data or to supplement the internal storage module 309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 300 also has a communications interface 308 to permit coupling of the device 300 to a computer or communications network 320 via a connection 321. The connection 321 may be wired or wireless. For example, the connection 321 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The device 300 is connected to the probes 110 and 120 (shown in FIGS. 1 and 2). To control the probes 110 and 120 to transmit ultrasound, the processor 305 transmits a control signal (e.g., in the form of a pulse) to the probes 110 and 120. The probe 110 or 120 receiving the control signal then converts the control signal to sound waves. Further, when the probe 110 or 120 receives ultrasound, the probe 110 or 120 converts the ultrasound to an electrical signal. In turn, the processor 305 receives the electrical signal and converts the received electrical signal into digital data.

The methods described hereinafter may be implemented using the embedded controller 302, where the processes shown in FIG. 4 may be implemented as one or more software application programs 333 executable within the embedded controller 302. The device 300 of FIG. 3A implements the described methods. In particular, with reference to FIG. 3B, the steps of the described methods are effected by instructions in the software 333 that are carried out within the controller 302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 333 of the embedded controller 302 is typically stored in the non-volatile ROM 360 of the internal storage module 309. The software 333 stored in the ROM 360 can be updated when required from a computer readable medium. The software 333 can be loaded into and executed by the processor 305. In some instances, the processor 305 may execute software instructions that are located in RAM 370. Software instructions may be loaded into the RAM 370 by the processor 305 initiating a copy of one or more code modules from ROM 360 into RAM 370. Alternatively, the software instructions of one or more code modules may be pre-installed in a non-volatile region of RAM 370 by a manufacturer. After one or more code modules have been located in RAM 370, the processor 305 may execute software instructions of the one or more code modules.

The software 333 also includes databases containing data required for performing the non-destructive testing. Examples of the data include celerity of sound in materials, celerity of sound at different liquid pressure, and celerity of sound at different temperatures.

The application program 333 is typically pre-installed and stored in the ROM 360 by a manufacturer, prior to distribution of the device 300. However, in some instances, the application programs 333 may be supplied to the user encoded on one or more CD-ROM (not shown) and read via the portable memory interface 306 of FIG. 3A prior to storage in the internal storage module 309 or in the portable memory 325. In another alternative, the software application program 333 may be read by the processor 305 from the network 320, or loaded into the controller 302 or the portable storage medium 325 from other computer readable media. Computer readable storage media refers to any non-transitory tangible storage medium that participates in providing instructions and/or data to the controller 302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 300. Examples of transitory or non-tangible computer readable transmission media that may also participate in the provision of software, application programs, instructions and/or data to the device 300 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 333 and the corresponding code modules mentioned above may be executed to implement one or more graphical user interfaces (GUIs) to be rendered or otherwise represented upon the display 314 of FIG. 3A. Through manipulation of the user input device 313 (e.g., the keypad), a user of the device 300 and the application programs 333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 3B illustrates in detail the embedded controller 302 having the processor 305 for executing the application programs 333 and the internal storage 309. The internal storage 309 comprises read only memory (ROM) 360 and random access memory (RAM) 370. The processor 305 is able to execute the application programs 333 stored in one or both of the connected memories 360 and 370. When the device 300 is initially powered up, a system program resident in the ROM 360 is executed. The application program 333 permanently stored in the ROM 360 is sometimes referred to as "firmware". Execution of the firmware by the processor 305 may fulfil various functions, including processor management, memory management, device management, storage management and user interface.

The processor 305 typically includes a number of functional modules including a control unit (CU) 351, an arithmetic logic unit (ALU) 352, a digital signal processor (DSP) 353 and a local or internal memory comprising a set of registers 354 which typically contain atomic data elements 356, 357, along with internal buffer or cache memory 355. One or more internal buses 359 interconnect these functional modules. The processor 305 typically also has one or more interfaces 358 for communicating with external devices via system bus 381, using a connection 361.

The application program 333 includes a sequence of instructions 362 though 363 that may include conditional branch and loop instructions. The program 333 may also include data, which is used in execution of the program 333. This data may be stored as part of the instruction or in a separate location 364 within the ROM 360 or RAM 370.

In general, the processor 305 is given a set of instructions, which are executed therein. This set of instructions may be organised into blocks, which perform specific tasks or handle specific events that occur in the device 300. Typically, the application program 333 waits for events and subsequently executes the block of code associated with that event. Events may be triggered in response to input from a user, via the user input devices 313 of FIG. 3A, as detected by the processor 305. Events may also be triggered in response to other sensors and interfaces in the device 300.

The execution of a set of the instructions may require numeric variables to be read and modified. Such numeric variables are stored in the RAM 370. The disclosed method uses input variables 371 that are stored in known locations 372, 373 in the memory 370. The input variables 371 are processed to produce output variables 377 that are stored in known locations 378, 379 in the memory 370. Intermediate variables 374 may be stored in additional memory locations in locations 375, 376 of the memory 370. Alternatively, some intermediate variables may only exist in the registers 354 of the processor 305.

The execution of a sequence of instructions is achieved in the processor 305 by repeated application of a fetch-execute cycle. The control unit 351 of the processor 305 maintains a register called the program counter, which contains the address in ROM 360 or RAM 370 of the next instruction to be executed. At the start of the fetch execute cycle, the contents of the memory address indexed by the program counter is loaded into the control unit 351. The instruction thus loaded controls the subsequent operation of the processor 305, causing for example, data to be loaded from ROM memory 360 into processor registers 354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 333, and is performed by repeated execution of a fetch-execute cycle in the processor 305 or similar programmatic operation of other independent processor blocks in the device 300.

Figure 4:
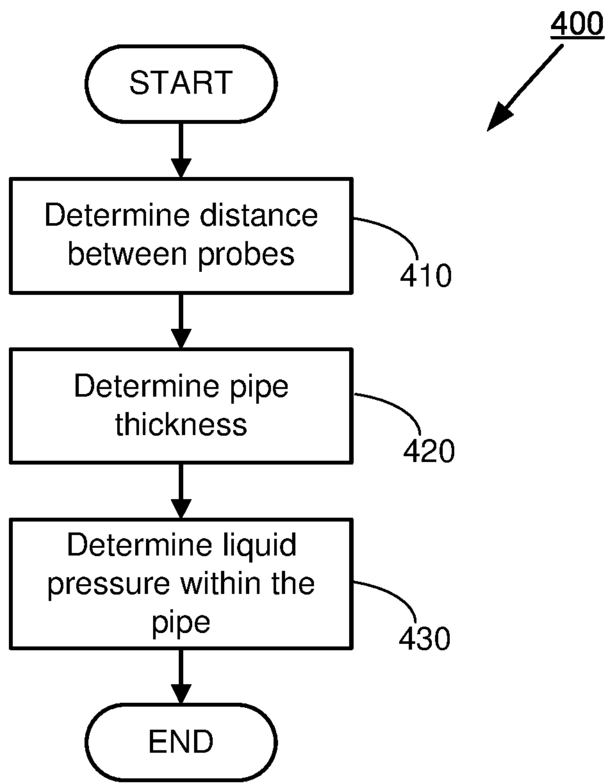
FIG. 4 is a flow diagram of a method of measuring a liquid pressure within a pipe according to the present disclosure.

FIG. 4 illustrates a method 400 for determining a liquid pressure within a pipe 400. The method 400 is implemented as one or more software application programs 333 stored in the internal storage module 309 and executable within the embedded controller 302 (as described above in relation to FIGS. 3A and 3B).

The method 400 starts at step 410 by determining the distance between the probes 110 and 120 when the probes 110 and 120 are disposed on the opposite surface of the pipe 400. As discussed above, the track 130 includes a sensor to determine the position of the probe 110 along the track 130. Based on the determined position of the probe 110 along the track 130, the half circumference 114 of the pipe 400 can be determined. The size of the pipe 400 can then be determined using the equation:

$$D=2C/\pi$$

where D is the diameter of the pipe 400, and C is the half circumference of the pipe 400 (as determined based on the location of the probe 110 along the track 130).

The distance between the probes 110 and 120 is then determined using the equation:

$$Dprobe=D/\cos\theta$$

where D is the diameter of the pipe 400, and θ is the angle between the probes 110 and 120.

The method 400 then proceeds from step 410 to step 420.

In step 420, the thickness of the pipe 400 is determined. The thickness of the pipe 400 is determined at the respective locations at which the probes 110 and 120 are coupled to the pipe 400.

The control unit 300 transmits a control signal to each of the probes 110 and 120 to transmit ultrasound. Each of the probes 110 and 120 then receives a reflection of the transmitted ultrasound from the pipe-liquid interface. The control unit 300 records the time t taken between transmitting and receiving the ultrasound. The control unit 300 then uses the following equation:

$$l=ct/2$$

where l is the thickness of the pipe where a probe is coupled, c is the celerity of sound in a material, and t is the time taken between transmitting and receiving the ultrasound.

As discussed above, the software 333 contains a database of celerity of sound in materials. In one arrangement, the control unit 300 displays a selection of materials on which the method 400 is to be performed on the display unit 314. In response, a user selects one of the displayed materials using the user input device(s) 313. The control unit 300 then uses the selected material and corresponding celerity to calculate the thickness of the pipe.

The method 400 then proceeds from step 420 to step 430.

In step 430, the liquid pressure within the pipe 400 is determined. As discussed above, the control unit 300 has a database containing the celerity of sound and different liquid pressure at different liquid temperature. Accordingly, the celerity of sound in the liquid 500 is to be determined.

To determine the celerity of sound in the liquid 500, the control unit 300 determines the time taken by ultrasound through the liquid 500 and the distance traversed in the liquid 500. However, when ultrasound is transmitted and received by the probes 110 and 120, the ultrasound also traverses through the pipe 400. The time and distance traversed through the pipe 400 are removed to obtain an accurate celerity of sound through the liquid 500.

The control unit 300 first obtains the total time taken to transmit and receive ultrasound through both the pipe 400 and liquid 500. The total time is then reduced by the time taken to traverse the pipe 400.

The control unit 300 then obtains the distance traversed through the liquid 500 by reducing Dprobe (see step 410 above) with the distance traversed by the ultrasound through the pipe 400.

To obtain the total time traversed by the ultrasound through the liquid 500, the control unit 300 transmits a control signal to the probe 110 to transmit ultrasound. In turn, the probe 120 receives the ultrasound transmitted by the probe 110 and converts the received ultrasound into an electrical signal, which is received by the control unit 300.

The control unit 300 then determines the time taken between the transmission and receipt of the ultrasound. The control unit 300 then determines the traverse time tt of the ultrasound through the liquid 500 by using the following equation:

$$tt=t1-(l1*c)-(l2*c)$$

where tt is the traverse time of the ultrasound through the liquid 500, t1 is the time recorded between the transmission and receipt of the ultrasound, c is the celerity of sound through the material of the pipe 400, l1 is the thickness of the pipe 400 to be traversed at probe 110, and l2 is the thickness of the pipe to be traversed at probe 120.

Both l1 and l2 are determined using the equations:

$$l1=l(\text{at probe } \mathbf{110})/\cos\theta$$

$$l2=l(\text{at probe } \mathbf{120})/\cos\theta$$

where l is the thickness of the pipe 400 at the respective probes 110 and 120 as determined in step 420.

The control unit 300 then determines the distance traversed by the ultrasound in the liquid 500. The control unit 300 uses the following equation:

$$Dliquid=Dprobe-l1-l2$$

where Dliquid is the distance traversed by the ultrasound in the liquid 500, Dprobe (see step 410) is the distance between the probes 110 and 120, l1 is the thickness of the pipe 400 to be traversed at probe 110, and l2 is the thickness of the pipe to be traversed at probe 120.

The celerity of sound through the liquid 500 is then obtained by using the equation:

$$cliquid=Dliquid/tt$$

where cliquid is the celerity of sound through the liquid 500, and Dliquid is determined above.

Once the celerity of sound through the liquid 500 is known, the determined celerity is compared against the database to determine the pressure of the liquid 500 at a temperature detected by the temperature sensor of the device 200. The temperature detected by the temperature sensor is considered to be the temperature of the liquid 500. The determined liquid pressure can be displayed on the display unit 314.

The method 400 concludes at the conclusion of step 430.

If any of the steps of the method 400 cannot be performed, then the control unit 300 displays an error message on the display 314. For example, an error may occur when there is an air gap in the pipe.

Figure 5:
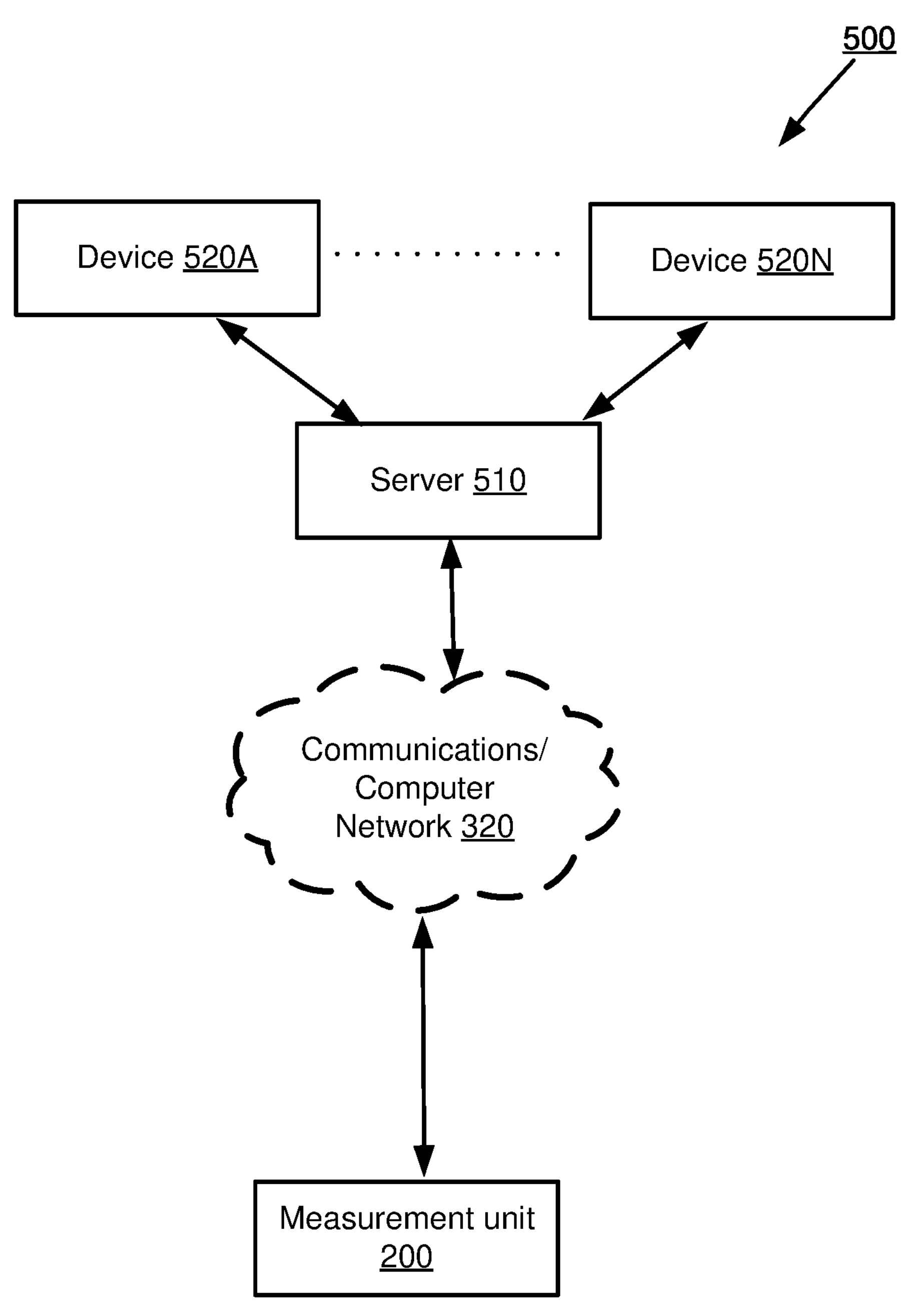
FIG. 5 shows a system for remotely controlling and monitoring the device of FIG. 2.

FIG. 5 shows a system 500 for remotely controlling and monitoring the device 200. The system 500 includes the device 200, the network 320, a server 510, and computing devices 520A to 520N. The device 200 is connected to the network 320. As previously discussed in relation to FIG. 2 and FIG. 3A, the device 200 has a control unit 300 that is coupled to the network 320. In the system 500, the network 320 is further connected to the server 510, which in turn is connected to the computing devices 520A to 520N.

The computing devices 520A to 520N may be a desktop, a laptop, a tablet, a smartphone, and the like. The computing devices 520A to 520N may be used by any one of a building manager responsible for the pipe 400, a maintenance worker responsible for the pipe 400, an entity such as a back to base monitoring company, insurance company to prove sprinkler protection of assets, water network suppliers (e.g., monitoring a sudden loss of water pressure), and the like.

In one arrangement, the device 200 is disposed on the pipe 400 permanently to enable continuous monitoring of the pipe 400. The device 200 is programmed to periodically (e.g., every minute, every 10 minutes, and the like) measure the pressure of the liquid 500 within the pipe 400. Once the pressure of the liquid 500 is obtained by the device 200, the device 200 (via the control unit 300) transmits the obtained data to the server 510 via the network 320 periodically.

The server 510 receives the data relating to the pressure of the liquid 500. The server 510 then processes the received data to determine whether there is an anomaly with the pressure of the liquid 500. Some examples of anomalies include a sudden increase in pressure of the liquid 500, a sudden decrease in pressure of the liquid 500, and like. In one arrangement, the server 510 is connected to other relevant systems (e.g., an insurance system). If the server 510 detects that the pipe 400 is pressurized, then the server 510 sends a notice via the other relevant systems that work on the pipe 400 may not commence until after the pipe 400 has been depressurized. However, if the server 510 detects that the pipe 400 has been depressurized, the server 510 sends a notice via the other relevant systems that work on the pipe 400 may commence. Such an arrangement prevents an unlicensed work to be performed on the pipe 400 while the pipe 400 is still pressurized.

If the server 510 detects an anomaly, then the server 510 transmits an alarm to the computing devices 520A to 520N to alert the users of the devices 520A to 520N. The users in turn can promptly rectify issues relating to the pipe 400, for example by shutting the valve to the pipe 400. The device 200 has a serial number that is related to one pipe 400. The use of a serial number on a device 200 enables the system 500 to have multiple devices 200, each of which is measuring the pressure of the liquid 500 of one particular pipe 400. Thus, any anomalies detected by one particular device 200 can be attributed to one particular pipe 400.

If the server 510 determines that the received data is within the typical pressure range, then the server 510 stores the data. In an alternative arrangement, the server 510 periodically pushes the stored data to the computing devices 520A to 520N, to enable the users of the computing devices 520A to 520N to have ready access to the measured pressure of the liquid 500.

The system 500 also enables a user to remotely control the device 200 using one of the computing device 520A to 520N. In one arrangement, the user can change certain settings of the device 200. In one example, the user of a computing device 520A can change the frequency of the measurements taken by the device 200. The user first selects the device 200 and changes the desired setting (e.g., setting the periodic measurement to be more frequent) on the computing device 520A. The computing device 520A then transmits the instructions (including the device 200 to be changed and the new settings) to the server 510. The server 510, in turn, transmits the instructions to the selected device 200. The selected device 200 receives the new instructions and changes the settings accordingly.

INDUSTRIAL APPLICABILITY

The arrangements described are applicable to a non-destructive device and method for determining liquid pressure within a pipe.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

Appendix 1

The density of a liquid can be expressed as:

A $\rho = m/V$ where $\rho$ = density of liquid (kg/m$^3$)

m = mass of the liquid (kg)

V = volume of the liquid (m$^3$)

When temperature increases - most liquid expands:

B
$$\begin{aligned} dV &= V1 - V0 \\ &= V0\,\beta dt \\ &= V0\beta(t1 - t0) \end{aligned}$$

where dV = V1 − V0 = change in volume - difference between final and initial volume (m$^3$)

$\beta$ = volumetric temperature expansion coefficient (m$^3$/m$^3$ ° C.)

dt = t1 − t0 = change in temperature - difference between final and initial temperature (° C.)

B can be modified to:

C $V1 = V0\,(1 + \beta\,(t1 - t0))$

Density and change in Temperature

With A and B the final density after a temperature change can be expressed as

-continued

| Appendix 1 |
|---|
| D $\rho 1 = m/(V0\,(1 + \beta\,(t1 - t0)))$ where $\rho 1$ = final density (kg/$m^3$) or combined with (2) |
| E $\rho 1 = \rho 0/(1 + \beta\,(t1 - t0))$ |
| The influence of pressure on the volume of a liquid can be expressed with the three dimensional Hooke's law: |
| F $E = -dp/(dV/V0) = -(p1 - p0)/((V1 - V0)/V0)$ |
| where E = bulk modulus − liquid elasticity (N/$m^2$) The minus sign corresponds to the fact that an increase in the pressure leads to a decrease in volume. With E - the final volume after pressure change can be expressed as |
| G $V1 = V0\,(1 - (p1 - p0)/E)$ |
| Combining F with A - the final density can be expressed as: |
| H $\rho 1 = m/(V0\,(1 - (p1 - p0)/E))$ |
| or combined with (2) − the final density can be expressed as |
| / $\rho 1 = \rho 0/(1 - (p1 - p0)/E)$ |
| Density of a fluid changing both Temperature and Pressure: |
| The density of a fluid when changing both temperature and pressure can be expressed combining E and /: |
| $\rho 1 = \rho 1(\text{from eq. } 1)/(1 - (p1 - p0)/E) = \rho 0/(1 + \beta(t1 - t0))/(1 - (p1 - p0)/E)$ |
| Example - Density of Water at 100 bar and 20° C. density of water 0° C.: 999.8 (kg/$m^3$) expansion coefficient of water at 10° C.: 0.000088 ($m^3/m^3$ ° C.) (average value between 0 and 20° C.) bulk modulus of water: $2.15 \times 10^9$ (N/$m^2$) Density of water can be calculated with C: |
| $\rho 1 = (999.8\ \text{kg/m}^3)/(1 + (0.000088\ \text{m}^3/\text{m}^3\ °\text{C.})((20°\text{C.}) - (0°\text{C.})))/(1 - ((100\,105\ \text{Pa}) - (1\,105\ \text{Pa}))/(2.15\ 109\ \text{N/m}^2)) = 1002.7\ (\text{kg/m}^3)$ |

The invention claimed is:

1. A device configured for determining a pressure of liquid within a pipe, the device comprising:

a first probe;

a second probe; and a control unit, wherein the control unit is configured to execute an application program to perform a method of determining the pressure of liquid within the pipe, the method comprising:

transmitting, by the first probe, ultrasound, wherein the first probe is disposed on a surface of the pipe;

receiving, by the second probe, the transmitted ultrasound, the second probe being disposed on a surface of the pipe opposite to the first probe;

determining a thickness of the pipe at a surface on which the first probe or the second probe is disposed, wherein the pipe thickness at the surface on which the first probe is disposed is determined using ultrasound transmitted by the first probe, or wherein the pipe thickness at the surface on which the second probe is disposed is determined using ultrasound transmitted by the second probe;

determining a celerity of the transmitted ultrasound through the liquid within the pipe based on the determined pipe thickness;

determining the pressure of the liquid based on the determined celerity of the transmitted ultrasound, wherein the device further comprises a frame configured to be coupled to the pipe, wherein the first probe and the second probe are disposed on the frame; and a track disposed on the frame, wherein one of the first probe and the second probe is disposed on the track such that the first probe or the second probe is movable along the track, wherein, when the frame is disposed on the pipe, the first probe and the second probe are longitudinally offset along the pipe such that the second probe is located at an angle relative to the first probe, and wherein the probe disposed on the track is movable so that the second probe is disposed on the surface of the pipe opposite to the first probe.

2. The device of claim 1, wherein the determining of the celerity of the transmitted ultrasound further comprises:

determining a distance between the first probe and the second probe;

determining a distance of the liquid based on the determined distance between the first and second probes and the determined pipe thickness;

determining a time difference between the first probe transmitting the ultrasound and the second probe receiving the transmitted ultrasound;

determining a time taken to traverse the determined pipe thickness;

determining a time taken to traverse the liquid based on the determined time difference and the determined time taken to traverse the determined pipe thickness;

determining the celerity of the transmitted ultrasound through the liquid based on the determined distance of the liquid and the determined time taken to traverse the liquid.

3. The device according to claim 1, wherein the angle is in the range of 0° to 30°.

4. The device according to claim 1, wherein the determining of the thickness of the pipe further comprises:

transmitting, by the first probe, ultrasound;

receiving, by the first probe, the ultrasound transmitted by the first probe;

determining a time taken to transmit and receive the ultrasound by the first probe;

determining the thickness of the pipe on which the first probe is disposed based on the determined time taken by the first probe;

transmitting, by the second probe, ultrasound;

receiving, by the second probe, the ultrasound transmitted by the second probe;

determining a time taken to transmit and receive the ultrasound by the second probe; and determining the thickness of the pipe on which the second probe is disposed based on the determined time taken by the second probe.

5. The device according to claim 1, wherein the determining of the celerity of the transmitted ultrasound further comprises:

determining a temperature of the liquid, wherein the determining of the pressure of the liquid is further based on the determined temperature of the liquid.

6. The device according to claim 1, further comprising a computer program product comprising an application program for performing the method according to claim 1.

7. The device according to claim 1, further comprising:

a server, wherein the server is in communication with the device such that the determined pressure of the liquid is transmitted to the server.

8. The device according to claim 1, wherein the device is configured to determine the pressure of the liquid periodically and to transmit the determined pressure of the liquid to the server periodically.

9. The device according to claim 7, wherein the server is configured to change a setting of the device.

* * * * *